United States Patent [19]

Aimar

[11] 4,114,506
[45] Sep. 19, 1978

[54] SELF-TAPPING WING NUT

[75] Inventor: Michele Aimar, Turin, Italy

[73] Assignee: ITW Fastex Italia, S.p.A., Turin, Italy

[21] Appl. No.: 773,093

[22] Filed: Feb. 28, 1977

Related U.S. Application Data

[63] Continuation of Ser. No. 648,833, Jan. 14, 1976, abandoned.

[30] Foreign Application Priority Data

Jan. 14, 1975 [IT] Italy ............................ 19240/75

[51] Int. Cl.² ............................................ F16B 37/14
[52] U.S. Cl. ........................................ 85/32 W; 85/35; 85/36; 151/41.75
[58] Field of Search ............... 85/32 W, 35, 36, 32 K, 85/1 JP, 50 R, 80-83; 151/41.75; 24/217 R, 208 A

[56] References Cited

U.S. PATENT DOCUMENTS

| 2,088,100 | 7/1937 | Watson | 85/32 W |
| 2,386,922 | 10/1945 | Andrews et al. | 85/80 |
| 2,551,834 | 5/1951 | Ferguson | 85/35 X |
| 2,878,905 | 3/1959 | Langermeier | 85/35 X |
| 3,069,962 | 12/1962 | Rapata | 85/82 X |
| 3,119,430 | 1/1964 | DiRico | 85/35 X |
| 3,213,506 | 10/1965 | Fernberg | 24/217 R |
| 3,235,297 | 2/1966 | Fernberg | 24/217 R X |
| 3,273,441 | 9/1966 | Biesecker | 85/35 |
| 3,345,899 | 10/1967 | Fiddler | 85/35 X |
| 3,362,280 | 1/1968 | Muller | 85/35 |
| 3,448,466 | 6/1969 | Haldopoulos | 85/35 X |
| 3,826,458 | 7/1974 | Fisher | 85/80 X |

FOREIGN PATENT DOCUMENTS

| 933,050 | 7/1963 | United Kingdom | 85/35 |
| 996,455 | 6/1965 | United Kingdom | 85/80 |

Primary Examiner—Rodney H. Bonck
Attorney, Agent, or Firm—Jack R. Halvorsen

[57] ABSTRACT

The wing nut is formed from plastic meterial and is provided with a tubular shank portion. The inner surface of shank is self-tapped when the wing nut is forced onto a threaded stud projections from an air filter cover. A sucker-like collar portion is provided for abutting the cover wall.

3 Claims, 4 Drawing Figures

SELF-TAPPING WING NUT

This is a continuation, of application Ser. No. 648,833, filed Jan. 14, 1976, and now abandoned.

SELF-TAPPING WING NUT

This invention relates to wing nuts for fastening a cover to an air filter of motor vehicles.

The wing nuts at present used for this purpose are made of metal and are screwed onto one or more studs projecting from the air filter cover through a washer interposed therebetween. This assembly system is time consuming, particularly when the filter studs are more than one, as it is the case for filters of greater sizes. This time consuming assembly system considerably affects the costs of the mass-production of the motor vehicles.

This invention aims to reduce the assembly time of air filters in the mass-production of motor vehicles.

More particularly, the object of this invention is to provide a wing nut for fastening a cover to an air filter of motor vehicles, which is characterized in that the wing nut is formed from plastic material and is provided with a tubular shank portion the inner surface of which is self-tapped when the wing nut is forced onto a threaded stud projecting from said filter cover, and a sucker-like collar portion for abutting the cover wall.

The invention will be better understood from the following detailed description given merely by way of example and therefore not intended in limiting sense, taken in connection with the accompanying drawings, wherein.

Figure 1:
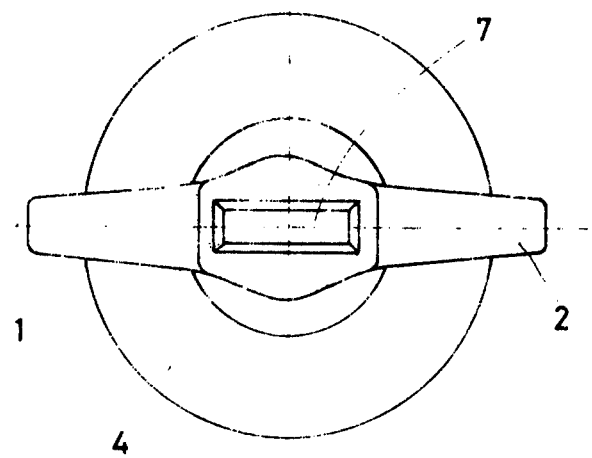
FIG. 1 is a plan view of a wing nut according to this invention.
Figure 2:
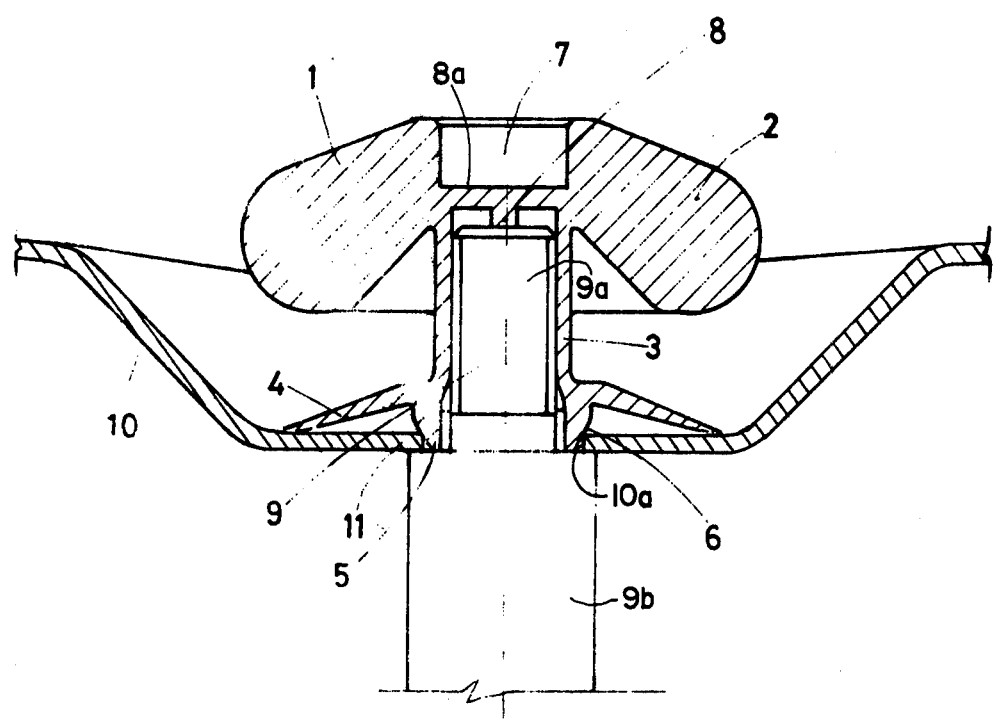
FIG. 2 is an axial sectional view of the wing nut of FIG. 1 in assembled relationship.

Referring first to FIGS. 1 and 2, there is shown a wing nut according to this invention and comprising a head having two wings 1, 2 from which a resilient smooth tubular shank portion 3 centrally projects. Adjacent the free end of the shank portion 3 a resilient sealing washer or collar 4 is provided. The shank portion 3 includes a flared mouth portion 5a which terminates in an enlarged annular edge section 5 having on the outside the a tapering forming a conical surface 6 extending axially downwardly below said washer.

At the top of head a screwdriver slot 7 is provided and at the closure wall 8a of the blind bore of shank 3 an abutting rib or stop 8 is provided.

The wing nut of the present invention is utilized with a threaded stud 9 of an air filter with a first threaded portion 9a and a second unthreaded portion 9b having a larger diameter than the threaded portion to form a shoulder or step means 11. The air filter cover 10 has a centrally disposed aperture having a diameter greater than the threaded portion 9a but less than the diameter of the unthreaded portion 9b. The distance from the free end of the threaded portion 9a to the shoulder 11 is controlled or predetermined and is equal to or slightly less then the distance between a pair of planes, perpendicular to the axis of the nut, which fall on the free extremity of edge section 5 and the stop 8 carried by the closure wall 8a.

In order to apply the so described wing nut to a threaded stud 9 of an air filter, the filter cover 10 is first placed over the threaded portion 9a until it rests on step or shoulder 11 of the stud having a diameter greater than said predetermined diameter and then the flared mouth 5a edge section 5 of the shank portion 3 is applied onto the stud and the shank portion is slid onto the stud by means of a blow dealt on the head of the wing nut until the washer or collar 4 is in sealing engagement relative to the cover 10. When the shank portion slides onto the stud, the inner surface of the blind bore of the shank, because of the yieldability of the material of which it is formed (generally nylon), becomes self-tapped assuming threads mating the threads of the stud. Because of the axial length relationship of the blind bore of shank portion 3 measured from the free end of edge section 5 to the closure wall 8a with its stop 8 is equal to or greater than the distance from the free end of threaded portion 9a to the shoulder 11, it can be seen in FIG. 2 that the tapered conical surface 6 is forced laterally outwardly into sealing engagement with the aperture 10a of the cover 10.

In the case the cover 10 should be removed in order to inspect or change the air filter, it is sufficient to unscrew the wing nut which had been self-tapped in the above described manner.

It is seen that the assembly of the wing nut is extremely quick to be performed since it is sufficient to deal the head thereof a blow to anchor the wing nut onto the filter cover. Such blow causes the shank portion to be self-tapped so as the wing nut thereafter can be unscrewed and screwed as the usual wing nuts.

Figure 3:
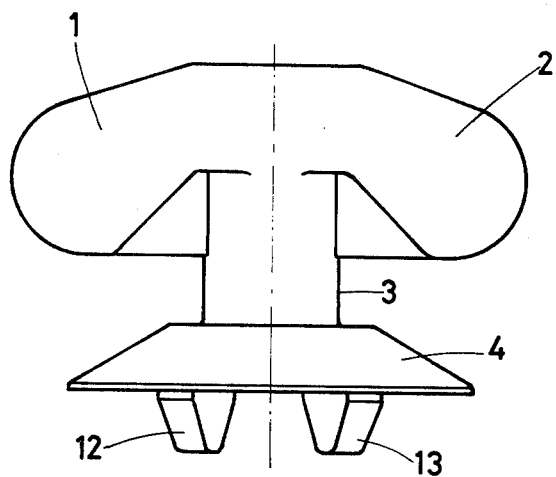
FIG. 3 is an elevation view of another embodiment of the wing nut according to this invention.
Figure 4:
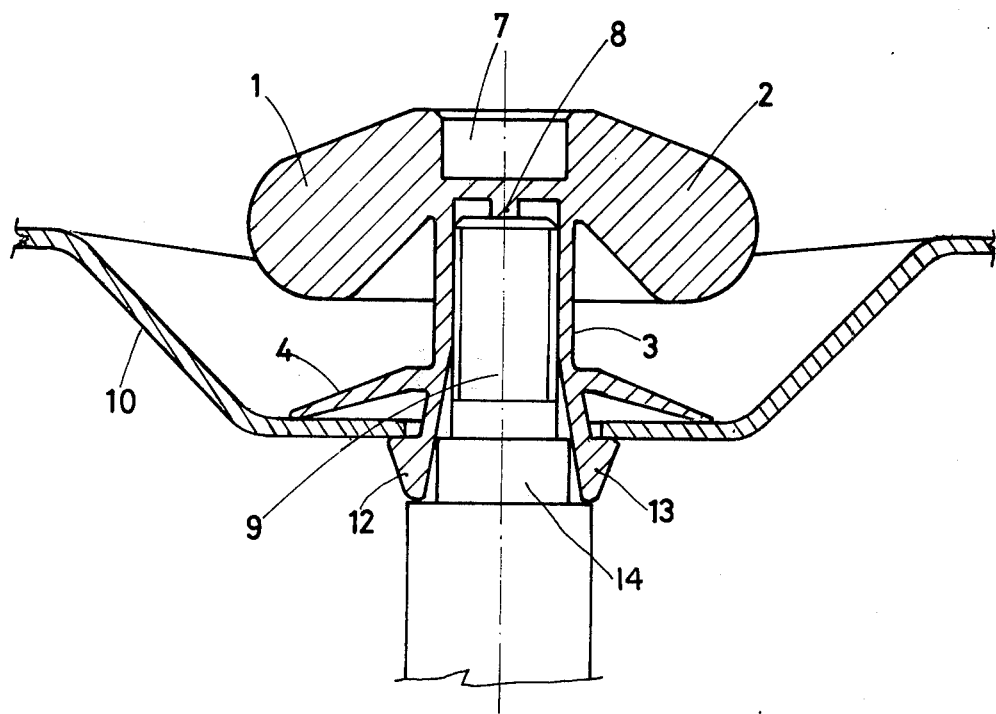
FIG. 4 is an axial sectional view of the wing nut of FIG. 3 in assembled relationship.

In FIGS. 3 and 4 another embodiment of the wing nut is shown. In this embodiment the shank portion of the wing nut is provided at the free end thereof with two hook portions 12, 13. Otherwise, this wing nut is similar to that of FIGS. 1 and 2, and for sake of simplicity, the same portions of the two described wing nuts have been given the same reference characters.

By means of the hook portions 12 and 13 the wing nut can be anchored to the filter cover before the application of the latter to the air filter. This can be useful particularly in the case of filters provided with a plurality of fastening studs (generally three) because covers with wing nuts already arranged thereon can be used and the fastening operation of the cover to the filter is therefore reduced to a simple centering of the cover on the filter followed by blows dealt on the heads of the wing nuts which cause the self-tapping of the shank portions and the anchoring of the suckers to the cover.

In the embodiment of FIGS. 3 and 4 the filter stud has a portion 14 of greater diameter than the threaded portion 9 in order to spread the hook portions 12 and 13 so as to anchor these hook portions to the cover.

While only two embodiments of the invention have been described and shown, it is obvious that various modifications and changes can be made without departing from the scope of the invention.

What I claim is:

1. A fastening assembly of an apertured cover for an air filter for internal combustion engines, a shouldered threaded stud and a one-piece plastic wing nut, said cover having a centrally disposed aperture of a predetermined diameter, said stud having a threaded end portion of a first diameter less than said predetermined diameter and an unthreaded portion of a second diameter greater than said predetermined diameter, the juncture of said first and second diameters forming shoulder means for supportive engagement of said cover adjacent said aperture when said cover is assembled with said stud, said shoulder being spaced from the free end of the threaded portion a predetermined distance, said wing nut including a head and a resilient tubular shank portion having a flared mouth at one end and having an internal diameter through a substantial portion of its length which is slightly less than said threaded portion and capable of being axially telescoped onto said threaded portion by an axial force, the inner surface of said shank portion being substantially smooth and self-tapping after said nut is seated on the threaded portion, a resilient sealing washer portion integral with and surrounding said shank portion and spaced from said flared mouth end, said washer portion sealingly abutting said cover in mounted relation, closure and stop means terminating the bore of said shank portion at the end thereof opposite said one end, said shank portion further including an externally tapered enlarged diameter annular edge section projecting below said washer portion and including cross-sectional diameters on said tapered edge section which at the free and thereof are less than said predetermined diameter of said cover aperture and greater than said predetermined diameter adjacent its juncture with said washer portion, the axial distance between planes perpendicular to the axis and which fall on the free end of said tapered edge section and on said closure and stop means being at least equal to said predetermined axial distance between the free end of the threaded portion and said shoulder means whereby telescopic axial assembly of said wing nut with said threaded portion results in engagement of the free end of said threaded portion with said closure and stop means and engagement of said annular tapered edge section with said shoulder means which insures spreading of said tapered edge section into sealing engagement with the cover wall forming said aperture.

2. A wing nut of the type claimed in claim 1 wherein the inner transverse wall of said shank portion at the end opposite the washer portion is provided with an axially extending secondary stop means whereby the axial blow for seating the shank on the stud is limited.

3. A wing nut in combination with a multiple diameter stud having a threaded free end portion for fastening a cover to the air filter of motor vehicles, characterized in that the wing nut is formed from plastic material and is provided with a resilient tubular shank portion the inner surface of which is self-tapping when the wing nut is axially forced onto said free end threaded portion of said stud projecting through an aperture in the cover of said filter, a resilient sealing washer-like collar portion intended to abut on the cover wall, said shank portion including a plurality of axially extending resilient hook-like portions for locking said shank portion to the filter cover, said stud including a pair of enlarged diameter portions each being successively greater than the threaded free end portion, the first of which is positioned adjacent said threaded portion forcing said hook portions laterally into locked engagement with said cover and said second enlarged diameter portion forming a shoulder against which said hook-like portions abut to prevent overdriving of said nut.

* * * * *